(12) United States Patent
Yao

(10) Patent No.: US 12,348,825 B2
(45) Date of Patent: *Jul. 1, 2025

(54) APPARATUS, SYSTEMS AND METHODS FOR PRE-TUNING A SECOND TUNER IN ANTICIPATION OF A CHANNEL SURFING ACTIVITY

(71) Applicant: DISH Broadcasting Corporation, Englewood, CO (US)

(72) Inventor: Kevin Yao, Cockeysville, MD (US)

(73) Assignee: DISH Broadcasting Corporation, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,639

(22) Filed: Apr. 8, 2024

(65) Prior Publication Data

US 2024/0259645 A1 Aug. 1, 2024

Related U.S. Application Data

(60) Continuation of application No. 17/006,630, filed on Aug. 28, 2020, now Pat. No. 11,962,863, which is a
(Continued)

(51) Int. Cl.
*H04N 21/482* (2011.01)
*H04N 5/50* (2006.01)
(Continued)

(52) U.S. Cl.
CPC ............. *H04N 21/482* (2013.01); *H04N 5/50* (2013.01); *H04N 21/4263* (2013.01);
(Continued)

(58) Field of Classification Search
CPC .. H04N 5/50; H04N 21/4263; H04N 21/4384; H04N 21/4662; H04N 21/4667; H04N 21/482; H04N 21/4826
See application file for complete search history.

(56) References Cited

U.S. PATENT DOCUMENTS 5,247,365 A 9/1993 Hakamada et al.
5,886,746 A 3/1999 Yuen et al.
(Continued)

FOREIGN PATENT DOCUMENTS

EP 2051511 A2 4/2009
GB 2356516 A 5/2001
(Continued)

*Primary Examiner* — Michael B. Pierorazio
(74) *Attorney, Agent, or Firm* — Perkins Coie LLP

(57) ABSTRACT

Two-tuner media device systems and methods are operable to pre-tune a second tuner in anticipation of a channel surfing activity. An exemplary embodiment receives a first content stream associated with a currently presented channel at a first tuner, determines an anticipated channel based upon the currently presented channel and a historical channel surfing pattern, receives a second content stream associated with the anticipated channel at a second tuner, detects an initiation of a channel surfing activity, and presents at least a video portion of the second content stream associated with the anticipated channel in response to detecting the initiation of the channel surfing activity.

20 Claims, 1 Drawing Sheet

Related U.S. Application Data continuation of application No. 14/285,885, filed on May 23, 2014, now Pat. No. 10,779,048, which is a division of application No. 12/815,759, filed on Jun. 15, 2010, now Pat. No. 8,739,196.

(51) Int. Cl.
  *H04N 21/426* (2011.01)
  *H04N 21/438* (2011.01)
  *H04N 21/466* (2011.01)

(52) U.S. Cl.
  CPC ..... *H04N 21/4384* (2013.01); *H04N 21/4662* (2013.01); *H04N 21/4667* (2013.01); *H04N 21/4826* (2013.01)

(56) References Cited

U.S. PATENT DOCUMENTS

| | | | |
|---|---|---|---|
| 6,115,080 A | 9/2000 | Reitmeier | |
| 6,118,498 A | 9/2000 | Reitmeier | |
| 6,804,824 B1 | 10/2004 | Potrebic et al. | |
| 7,313,806 B1 | 12/2007 | Williams et al. | |
| 7,532,253 B1 | 5/2009 | Greenberg | |
| 8,640,166 B1* | 1/2014 | Craner | H04N 21/4826 725/38 |
| 8,739,196 B2* | 5/2014 | Yao | H04N 21/482 725/38 |
| 10,412,427 B2* | 9/2019 | Wright | H04N 21/4424 |
| 10,779,048 B2* | 9/2020 | Yao | H04N 21/482 |
| 11,962,863 B2* | 4/2024 | Yao | H04N 21/482 |
| 2003/0159157 A1 | 8/2003 | Chan | |
| 2004/0001500 A1 | 1/2004 | Castillo | |
| 2004/0003399 A1 | 1/2004 | Cooper | |
| 2004/0194134 A1 | 9/2004 | Gunatilake et al. | |
| 2005/0216951 A1 | 9/2005 | MacInnis | |
| 2005/0240967 A1* | 10/2005 | Anderson | H04N 21/812 348/731 |
| 2006/0085828 A1 | 4/2006 | Dureau et al. | |
| 2009/0104871 A1 | 4/2009 | Cho | |
| 2010/0251296 A1* | 9/2010 | Kim | H04N 5/50 725/38 |
| 2014/0189736 A1* | 7/2014 | Kummer | H04N 21/434 725/39 |
| 2020/0364588 A1* | 11/2020 | Knox | G06V 40/20 |

FOREIGN PATENT DOCUMENTS

| | | |
|---|---|---|
| WO | 99/16247 A1 | 4/1999 |
| WO | 05/081660 | 9/2005 |

* cited by examiner

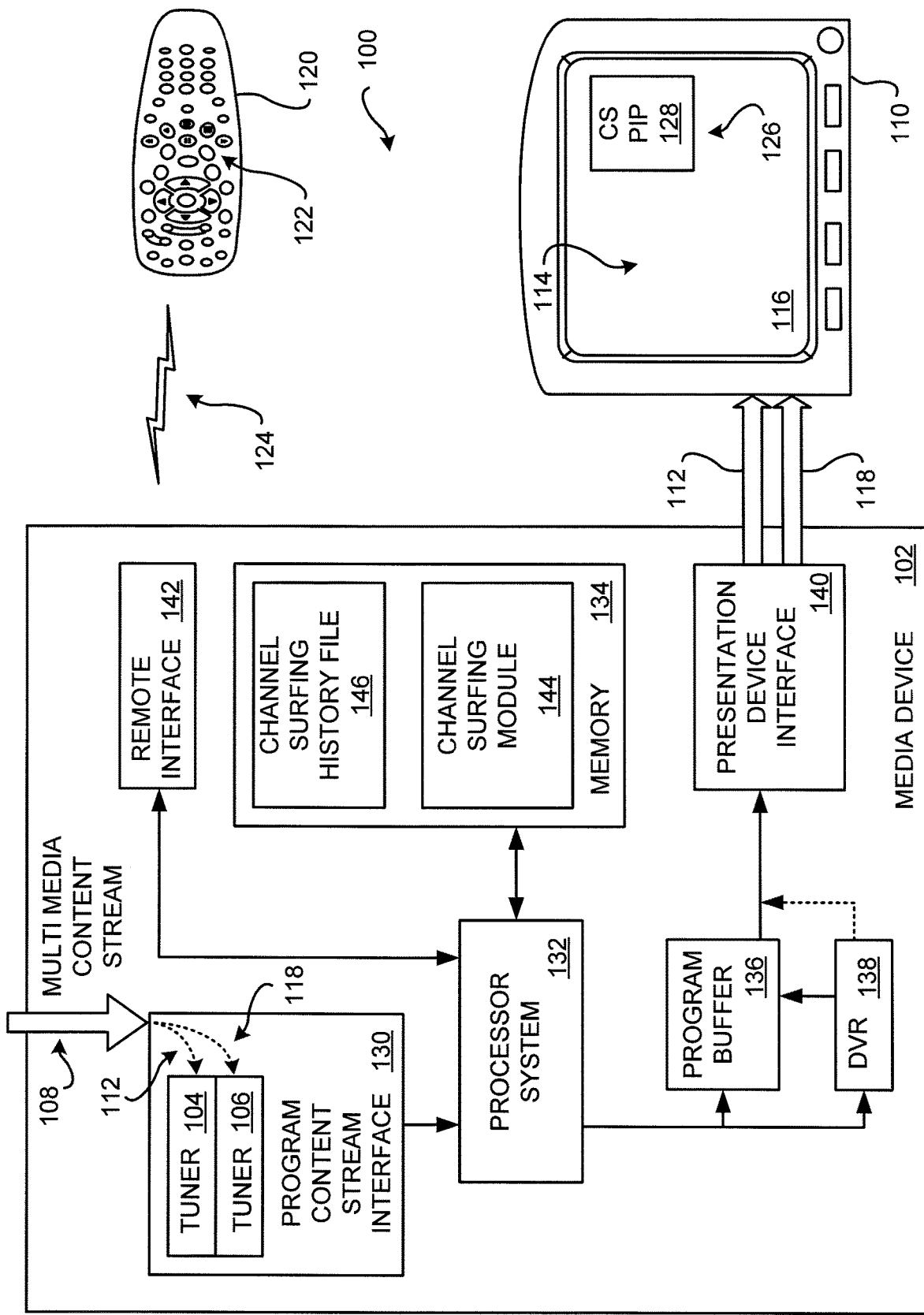

US 12,348,825 B2

APPARATUS, SYSTEMS AND METHODS FOR PRE-TUNING A SECOND TUNER IN ANTICIPATION OF A CHANNEL SURFING ACTIVITY

CROSS-REFERENCE TO RELATED APPLICATION

This patent application is a continuation of U.S. patent application Ser. No. 17/006,630, filed Aug. 28, 2020, which is a continuation of U.S. patent application Ser. No. 14/285,885, filed May 23, 2014, now U.S. Pat. No. 10,779,048, issued Sep. 15, 2020, which is a divisional of U.S. patent application Ser. No. 12/815,759, filed Jun. 15, 2010, now U.S. Pat. No. 8,739,196, issued May 27, 2014, the disclosures of which are incorporated herein by reference in their entirely.

BACKGROUND

Satellite based media content delivery systems are configured to receive program content from a satellite signal having a multi-media content stream. The satellite signal, detected by a satellite antenna or dish, communicates the multi-media content stream to a media device, such as a set top box. The multi-media content stream comprises a plurality of content streams that are multiplexed together.

Based on a selection made by a user, audio and video media content from a selected content stream is presented on a presentation device. The selected media content stream may be specified by an identifier, such as a channel number or the like. Non-limiting examples of a presentation device include a television, a personal computer, or the like.

At times, the user may browse through available channels to access the media content that is currently available on the various available channels. Known as channel surfing, the user actuates the media device to cause the tuner to decode a different one of the content streams from the multi-media content stream. Typically, the user operates the media device to increment the channels up or down by one channel.

However, the media device requires a small amount of time for its tuner to change its decoding process from the current selected content stream to the next selected content stream. The delay results from a time lag associated with changing a signal frequency that is detected by the tuner, a time lag associated with waiting for a first full and intact frame of video data (e.g.: an I-frame in a MPEG stream) to be received, and/or a time lag associated with decoding the digital bit stream into the stream of media content that is delivered to the media presentation device. Additional delays may occur if the media device performs various access authorization functions, such as when the selected next channel corresponds to a premium and/or pay per view channel that requires preauthorization.

The time lag is discernable to the user, and may be on the order of several seconds in some media devices. The discernable time lag that occurs as the user surfs from one channel to the next may be frustrating and undesirable to the user. Accordingly, there is a need in the arts to provide for faster channel changing when the user is channel surfing.

SUMMARY

Systems and methods of pre-tuning using a second tuner in a two-tuner media device in anticipation of a channel surfing activity are disclosed. An exemplary embodiment receives a first content stream associated with a currently presented channel at a first tuner, determines an anticipated channel based upon the currently presented channel and a historical channel surfing pattern, receives a second content stream associated with the anticipated channel at a second tuner, detects an initiation of a channel surfing activity, and presents at least a video portion of the second content stream associated with the anticipated channel in response to detecting the initiation of the channel surfing activity.

BRIEF DESCRIPTION OF THE DRAWINGS

Preferred and alternative embodiments are described in detail below with reference to the following drawings:

FIG. 1 is a block diagram of an embodiment of a second tuner channel surfing system implemented in a media device.

DETAILED DESCRIPTION

FIG. 1 is a block diagram of an embodiment of a channel surfing system 100 implemented in a two-tuner media device 102, such as, but not limited to, a set top box (STB), a television (TV), or a game playing device. Some embodiments of the channel surfing system 100 are limited to a first tuner 104 and a second tuner 106.

During operation, the first tuner 104 decodes a first content stream 112 from a received multi-media content stream 108. The first content stream 112 is associated with a currently presented first channel. The video and/or audio media content of the first content stream 112 is communicated to a media presentation device 110, such as a television or the like. The first channel may be identified by a designated indicia, such as a channel number, a program identifier (PID), and/or may be designated by a station call name or the like, generally referred to herein as a program channel identifier.

The video portion of the first content stream 112 is presented on a main field area 114 on a display 116 of the media presentation device 110. The audio portion of the first content stream 112 is presented on speakers on the media presentation device 110 (not shown), or by another audio presentation device, such as a stereo or a surround-sound receiver (not shown). When the user is not operating the two-tuner media device 102 in a channel surfing mode, only the video portion of the first content stream 112 is presented on the display 116.

Prior to initiation of the channel surfing by the user, embodiments of the channel surfing system 100 are configured to determine an anticipated channel that the user will select during an initiation of a channel surfing activity. Exemplary embodiments determine the anticipated channel based on historical channel surfing activity of the user. The second tuner 106 pre-tunes itself to the determined anticipated channel. When the user initiates the channel surfing activity, assuming that the user selects the anticipated channel, the second tuner 106 may more quickly provide a second content stream 118 associated with the anticipated channel since the second tuner 106 is already receiving the anticipated channel.

In the various applications, the presented channels are identified by their program channel identifier, such as a numeral. The user may be currently viewing channel "5" for example. Channel "6" is an adjacent program channel identifier. Accordingly, in an exemplary embodiment that has determined that channel "6" the anticipated channel that the user is likely to initially channel surf to, the second tuner 106 tunes to channel "6" and receives the second content stream 118. That is, the channel surfing system 100 operates the second tuner 106 to decode the video portion and/or the audio portion of the second content stream 118 associated with the anticipated channel. However, since the user has not commenced channel surfing, the video media content and any associated audio media content for the anticipated channel is not presented to the user.

At some point, the user may begin channel surfing. In the event that the user channel surfs to the anticipated channel that the second tuner 106 is currently receiving, presentation of the video and/or audio media content of the anticipated channel can rapidly begin. Accordingly, the delay associated with the time required for the second tuner 106 to tune to, and to decode the second content stream 118, is obviated.

As an illustration of the channel surfing process, the user may be viewing the video portion and listening to the audio portion of the first content stream 112 prior to initiation of channel surfing. The user, using their remote control 120, actuates one or more of the controllers 122 on the surface of the remote control 120 to cause the remote control 120 to generate and transmit a wireless command signal 124 to the two-tuner media device 102 to select a new channel to surf to. For example, a channel up button (or a channel down button) may be predefined to increment (or decrement) the currently presented channel that the second tuner 106 is receiving. Alternatively, the user may actuate another suitable user interface to control the two-tuner media device 102.

Prior to initiation of the channel surfing mode of operation, the second tuner 106 has been pre-tuned to the determined program channel identifier of the anticipated channel that the user is likely to surf to. That is, the second tuner channel surfing system 100 has anticipated which second content stream 118 is likely to be of interest to the user.

When the user begins channel surfing by selecting the program channel identifier of the anticipated channel, the video and/or audio media content of the second content stream 118 is communicated to the media presentation device 110. In an exemplary embodiment, the video portion of the second content stream 118 is presented on a picture-in-picture (PIP) field area 126 on the display 116 as a channel surfing (CS) PIP image 128. The audio portion of the second content stream 118 may not be presented so as not to interfere with the audio portion of the first content stream 112. Accordingly, the user is able to continue viewing of the video portion of the first content stream 112 on the main field area 114 of the display 116, and is concurrently able to view the video portion of the second content stream 118 that is presented on the CS PIP image 128.

On the other hand, the user may select a different program channel identifier to surf to that is different from the program channel identifier of the anticipated channel. The second tuner 106, or alternatively the first tuner 104, then tunes to, and decodes, the content stream of the selected other surfed to channel. In this situation, the delay associated with tuning to, and decoding of, the media content stream of the selected other channel may be substantially the same as a legacy media device.

Embodiments of the channel surfing system 100 may be implemented in a two-tuner media device 102. The non-limiting exemplary two-tuner media device 102 comprises a program content stream interface 130, a processor system 132, a memory 134, a program buffer 136, an optional digital video recorder (DVR) 138, a presentation device interface 140, and a remote interface 142. The memory 134 comprises portions for storing a channel surfing module 144 and a channel surfing history file 146. In some embodiments, the channel surfing module 144 may be integrated with other modules or logic. Other media devices may include some, or may omit some, of the above-described media processing components. Further, additional components not described herein may be included in alternative embodiments.

The functionality of the two-tuner media device 102 is now broadly described. A media content provider provides program content that is received in one or more multi-media content streams 108 multiplexed together in one or more transport channels. The transport channel with the multi-media content stream 108 are communicated to the two-tuner media device 102 from a media system sourced from a remote head end facility (not shown) operated by the media content provider. Non-limiting examples of such media systems include satellite systems, cable systems, over the air terrestrial systems, and the Internet. For example, if the media content provider provides programming via a satellite-based communication system, the two-tuner media device 102 is configured to receive one or more broadcasted satellite signals detected by an antenna (not shown). Alternatively, or additionally, the multi-media content stream 108 can be received from one or more different sources, such as, but not limited to, a cable system, a radio frequency (RF) communication system, or the Internet.

The one or more multi-media content streams 108 are received by the program content stream interface 130 with the first tuner 104 and the second tuner 106. The first tuner 104 selectively tunes to the first content stream 112 in accordance with instructions received from the processor system 132. The processor system 132 parses out video and/or audio media content associated with the program of interest. The first content stream 112 provided by the first tuner 104 is then assembled into a stream of video and/or audio information which may be stored by the program buffer 136 such that the program content can be streamed out to the media presentation device 110, via the presentation device interface 140. Alternatively, or additionally, the parsed out program content may be saved into the DVR 138 for later presentation. When the channel surfing is initiated by the user, the second content stream 118 is similarly processed and communicated to the media presentation device 110.

Some embodiments are configured to analyze a historical channel surfing pattern to learn which channel a user is likely to surf to upon initiation of a channel surfing activity. For example, the user may be watching a channel with the program channel identifier "x" prior to initiating the channel surfing activity. The user may surf to a channel having the program channel identifier "y" upon initiation of the channel surfing activity. The channel surfing system 100 monitors what channel the user surfs to (program channel identifier "y") and stores information corresponding to the surfed to channel and the currently presented channel (program channel identifier "x") in the channel surfing history file 146.

When history for a sufficient number of channel surfing activities have been monitored, the channel surfing system 100 may use the stored historical channel surfing pattern stored in the channel surfing history file 146 to learn to what program channel identifier the user is likely to surf to. That is, the channel surfing system 100 learns how to determine the anticipated channel based upon a relationship between the program channel identifier information corresponding to the currently presented channel and the program channel identifier information corresponding to the surfed to channel. Embodiments of the channel surfing system 100 may use any suitable learning system and any suitable learning criteria to learn the channel that the user is likely to surf to upon initiation of the channel surfing activity.

For example, a user may have historically, more often than not, incremented the present program channel identifier corresponding to the first content stream 112 by one channel. Accordingly, the channel surfing system 100 may cause the second tuner 106 to tune to a second content stream 118 corresponding to the program channel identifier that is incremented one channel above the currently presented channel corresponding to the first content stream 112.

To illustrate, the user may be watching video and/or audio media content for the channel with the program channel identifier "5" (currently received by the first tuner 104). The channel surfing system 100 may then determine that the program channel identifier for the anticipated channel should be channel "6" (channel "5" incremented by one channel). Accordingly, the second tuner 106 is pre-tuned to the program channel identifier "6" so that the second content stream 118 corresponds to the anticipated "6" channel.

As another example, the user may have a favorite channel or a most viewed channel that the user selects as the initial surfed to channel. For example, the program channel identifier "555" may be the identifier for a premium movie channel, a news channel, a sports channel, or the like. When the historical channel surfing patterns tend to indicate that the user will initially surf to the "555" program channel identifier, the channel surfing system 100 learns that the anticipated channel should correspond to the "555" program channel identifier. Accordingly, regardless of the current channel, the second tuner 106 is pre-tuned so that the second content stream 118 corresponds to the "555" program channel identifier.

Some embodiments may be configured to select the anticipated channel from a favorites list of program channel identifiers or a predefined list of program channel identifiers. For example, the user may specify a favorite list of sports channels. The second tuner 106 could be pre-tuned to the first channel in the favorites list. Alternatively, the second tuner 106 could be pre-tuned to a most favorite channel in the favorites list.

Alternatively, embodiments of the channel surfing system 100 may be predefined to a particular anticipated channel. An exemplary embodiment may be predefined to increment the currently presented program channel identifier by one channel above the currently viewed program channel identifier. An exemplary embodiment may be predefined to decrement the currently presented program channel identifier by one channel below the currently viewed program channel identifier. Another exemplary embodiment may be predefined to set the pre-tuned channel to a predefined program channel identifier specified by the user or another entity. Selection of the predefined program channel identifier may be made by presenting a graphical user interface, such as an electronic program guide (EPG), to the user. The user, actuating selected controller(s) 122 on the remote control 120, may then specify a program channel identifier of interest that the second tuner 106 will pre-tune to.

In alternative embodiments, the video and/or audio media content of the second content stream 118 may be presented in another format upon initiation of the channel surfing activity. For example, but not limited to, the video content of the second content stream 118 may be presented as the secondary channel in a picture over picture (POP) format, a split screen format, or another suitable dual image format wherein the video and/or audio media content of the current channel is continued to be presented. In other embodiments, the video and/or audio media content of the current channel is presented as the secondary channel in the PIP, POP or other dual image format. In another embodiment, presentation of the video and/or audio media content of the current channel is discontinued and is replaced by the video and/or audio media content of the second content stream 118 upon initiation of the channel surfing activity. Embodiments may be configured to allow the user to predefine or select any one of the above-described image presentation formats.

Some embodiments may be configured to alternatively, or additionally, communicate the CS PIP image 128 to another device having a display. For example, the CS PIP image 128 could be communicated to and then presented on a remote control display, a cellular phone display, a personal computer display, or the like.

Some embodiments may be configured to display a message to the user indicating the program channel identifier of the channel that the second tuner 106 is pre-tuned to. For example, a banner or the like could be presented at the top, bottom, or side of the main field area 114 on the display 116 of the media presentation device 110 to indicate the program channel identifier of the anticipated channel that the second tuner 106 is pre-tuned to. Based on the indicated pre-tuned program channel identifier, some embodiments may be configured to permit the user to redefine or select a different program channel identifier that the second tuner 106 will be pre-tuned to.

Some media device embodiments may include three or more tuners (not shown). In such embodiments, for example, the third tuner could be pre-tuned to a next anticipated channel that the user is likely to tune to. Such three-tuner media device embodiments may be configured to allow the user to specify the channel that the third tuner is pre-tuned to.

It should be emphasized that the above-described embodiments of the channel surfing system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method comprising:
   presenting a first content stream on a display associated with a media device, wherein a first tuner of the media device is tuned to the first content stream that is associated with a first program channel identifier;
   retrieving a second program channel identifier from a memory device subsequent to presenting the first content stream on the display;
   in response to retrieving the second program channel identifier, operating a second tuner to become tuned to a second content stream associated with the second program channel identifier;
   detecting, after the second tuner has become tuned to the second content stream, an initiation of a channel surfing activity; and
   in response to detecting the initiation of the channel surfing activity, presenting on the display, concurrently with a first video portion of the first content stream, at least a second video portion of the second content stream.

2. The method of claim 1, further comprising:
   presenting a notification on the display prior to detecting the initiation of the channel surfing activity, wherein the notification indicates the second program channel identifier.

3. The method of claim 1, further comprising:
presenting an electronic program guide (EPG) on the display, wherein the EPG indicates the second program channel identifier;
receiving a user specification that predefines a third program channel identifier, wherein the third program channel identifier is associated with a third content stream;
storing the third program channel identifier in the memory device; and
pre-tuning the second tuner to receive the third content stream.

4. The method of claim 1, further comprising:
tuning the first tuner to receive a third content stream corresponding to a third channel associated with a third program channel identifier, wherein the second tuner remains tuned to the second content stream; and
presenting at least a third video portion of the third content stream associated with the third channel that is received at the first tuner.

5. The method of claim 4, further comprising:
presenting at least the third video portion of the third content stream associated with the third program channel identifier in response to detecting the initiation of the channel surfing activity.

6. The method of claim 1, further comprising:
receiving the second program channel identifier based on a historical channel surfing pattern between a first program channel associated with the first program channel identifier and a second program channel associated with the second program channel identifier.

7. The method of claim 1, further comprising:
operating, after receiving and storing the second program channel identifier, the first tuner to become tuned to the first content stream.

8. A system comprising:
one or more processors; and
one or more memories storing instructions that, when executed by the one or more processors, cause the system to perform a process comprising:
  presenting a first content stream on a display associated with a media device, wherein a first tuner of the media device is tuned to the first content stream that is associated with a first program channel identifier;
  retrieving a second program channel identifier from a memory device subsequent to presenting the first content stream on the display;
  in response to retrieving the second program channel identifier, operating a second tuner to become tuned to a second content stream associated with the second program channel identifier;
  detecting, after the second tuner has become tuned to the second content stream, an initiation of a channel surfing activity; and
  in response to detecting the initiation of the channel surfing activity, presenting on the display, concurrently with a first video portion of the first content stream, at least a second video portion of the second content stream.

9. The system according to claim 8, wherein the process further comprises:
presenting a notification on the display prior to detecting the initiation of the channel surfing activity, wherein the notification indicates the second program channel identifier.

10. The system according to claim 8, wherein the process further comprises:
presenting an electronic program guide (EPG) on the display, wherein the EPG indicates the second program channel identifier;
receiving a user specification that predefines a third program channel identifier, wherein the third program channel identifier is associated with a third content stream;
storing the third program channel identifier in the memory device; and
pre-tuning the second tuner to receive the third content stream.

11. The system according to claim 8, wherein the process further comprises:
tuning the first tuner to receive a third content stream corresponding to a third channel associated with a third program channel identifier, wherein the second tuner remains tuned to the second content stream; and
presenting at least a third video portion of the third content stream associated with the third channel that is received at the first tuner.

12. The system according to claim 11, wherein the process further comprises:
presenting at least the third video portion of the third content stream associated with the third program channel identifier in response to detecting the initiation of the channel surfing activity.

13. The system according to claim 8, wherein the process further comprises:
receiving the second program channel identifier based on a historical channel surfing pattern between a first program channel associated with the first program channel identifier and a second program channel associated with the second program channel identifier.

14. The system according to claim 8, wherein the process further comprises:
operating, after receiving and storing the second program channel identifier, the first tuner to become tuned to the first content stream.

15. A non-transitory computer-readable medium storing instructions that, when executed by a computing system, cause the computing system to perform operations comprising:
presenting a first content stream on a display associated with a media device, wherein a first tuner of the media device is tuned to the first content stream that is associated with a first program channel identifier;
retrieving a second program channel identifier from a memory device subsequent to presenting the first content stream on the display;
in response to retrieving the second program channel identifier, operating a second tuner to become tuned to a second content stream associated with the second program channel identifier;
detecting, after the second tuner has become tuned to the second content stream, an initiation of a channel surfing activity; and
in response to detecting the initiation of the channel surfing activity, presenting on the display, concurrently with a first video portion of the first content stream, at least a second video portion of the second content stream.

16. The non-transitory computer-readable medium of claim 15, wherein the operations further comprise:
presenting a notification on the display prior to detecting the initiation of the channel surfing activity, wherein the notification indicates the second program channel identifier.

17. The non-transitory computer-readable medium of claim 15, wherein the operations further comprise:
- presenting an electronic program guide (EPG) on the display, wherein the EPG indicates the second program channel identifier;
- receiving a user specification that predefines a third program channel identifier, wherein the third program channel identifier is associated with a third content stream;
- storing the third program channel identifier in the memory device; and
- pre-tuning the second tuner to receive the third content stream.

18. The non-transitory computer-readable medium of claim 15, wherein the operations further comprise:
- tuning the first tuner to receive a third content stream corresponding to a third channel associated with a third program channel identifier, wherein the second tuner remains tuned to the second content stream; and
- presenting at least a third video portion of the third content stream associated with the third channel that is received at the first tuner.

19. The non-transitory computer-readable medium of claim 18, wherein the operations further comprise:
- presenting at least the third video portion of the third content stream associated with the third program channel identifier in response to detecting the initiation of the channel surfing activity.

20. The non-transitory computer-readable medium of claim 15, wherein the operations further comprise:
- receiving the second program channel identifier based on a historical channel surfing pattern between a first program channel associated with the first program channel identifier and a second program channel associated with the second program channel identifier.

* * * * *